United States Patent [19]
Grady et al.

[11] Patent Number: 5,265,193
[45] Date of Patent: Nov. 23, 1993

[54] EFFICIENTLY ORGANIZING OBJECTS IN A RETE PATTERN MATCHING NETWORK

[75] Inventors: Charles R. Grady, Westerville; Greig Greenwald, Silver Spring, both of Md.

[73] Assignee: International Business Machines Corporation, Armonk, N.Y.

[21] Appl. No.: 876,833

[22] Filed: Apr. 30, 1992

[51] Int. Cl.⁵ .............................................. G06F 15/00
[52] U.S. Cl. .................................................... 395/64
[58] Field of Search ........................................... 395/64

[56] References Cited
U.S. PATENT DOCUMENTS

| | | | |
|---|---|---|---|
| 4,849,905 | 7/1989 | Loeb et al. | 395/64 |
| 4,882,691 | 11/1989 | Schor | 395/64 |
| 4,951,225 | 8/1990 | Lee et al. | 395/64 |
| 4,956,791 | 9/1990 | Lee et al. | 395/64 |
| 5,119,470 | 6/1992 | Highland et al. | 395/64 |
| 5,159,662 | 10/1992 | Grady et al. | 395/64 |
| 5,179,632 | 1/1993 | Masui et al. | 395/64 |

*Primary Examiner*—Allen R. MacDonald
*Attorney, Agent, or Firm*—Lauren C. Bruzzone; Jesse L. Abzug

[57] ABSTRACT

An improved expert system method for use with the RETE pattern matching algorithm is disclosed. At the heart of the invention is the concept of a "shuffleboard," a data structure conducive to sorting elements. The shuffleboard is essentially a list of lists. It is comprised of a set of nodes which are linked together in a series of columns. Each column corresponds to a test condition within a rule, and each node within a column corresponds to a variable referenced by the test condition. The shuffleboard approach provides a means of finding all tests using a given variable and associating those tests. The shuffleboard provides a frame of reference for constructing a new ordering of tests from which the RETE network can be constructed.

1 Claim, 9 Drawing Sheets

FIG. 1A

FIG. 1B

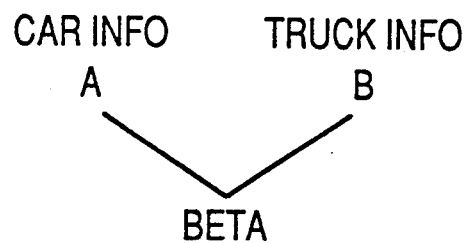

FIG. 2

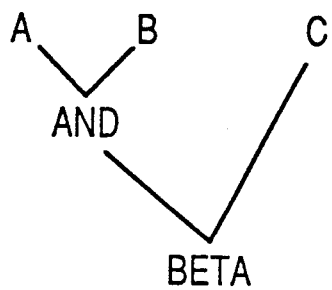

FIG. 3

```
Rule prob_a_swap
PRIORITY 20
p: problem  pl: plane  o: option  l: leg  s: station :
IF
    task = 'option_selected'           AND
    p.srch_done = 'FALSE'              AND
    pl.maint_type <> ' '               AND  /* plane is routed      */
    o.cover_type = 'DIRECT'            AND  /* going on ALT's route */
    l.termination = 'TRUE'             AND
    pl.maint_type = 'A'                AND
    s.A_check = 'FALSE'                AND
    pl.tail_number = p.prob_plane      AND  /* pick problem plane   */
    o.preference = optsel              AND
    l.date = pl.maint_date             AND  /* ALT's term on date   */
    l.plane_number = o.alt_plane       AND
    s.name = l.term_station                 /* name of station for mnt */
THEN
    . . . . .
END
```

FIG. 6

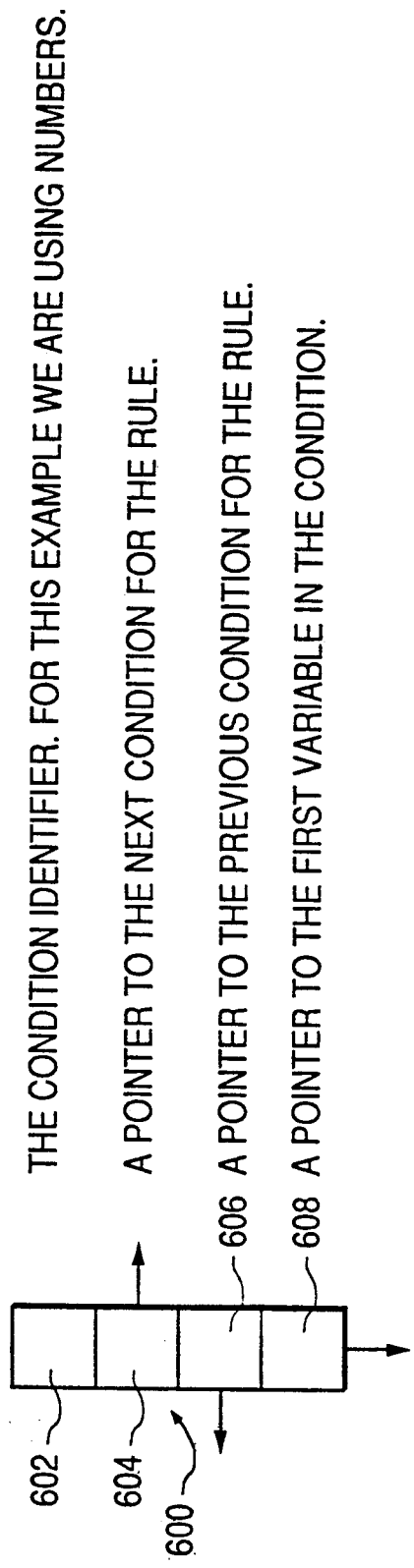

- 602 THE CONDITION IDENTIFIER. FOR THIS EXAMPLE WE ARE USING NUMBERS.
- 604 A POINTER TO THE NEXT CONDITION FOR THE RULE.
- 606 A POINTER TO THE PREVIOUS CONDITION FOR THE RULE.
- 608 A POINTER TO THE FIRST VARIABLE IN THE CONDITION.

FIG. 7

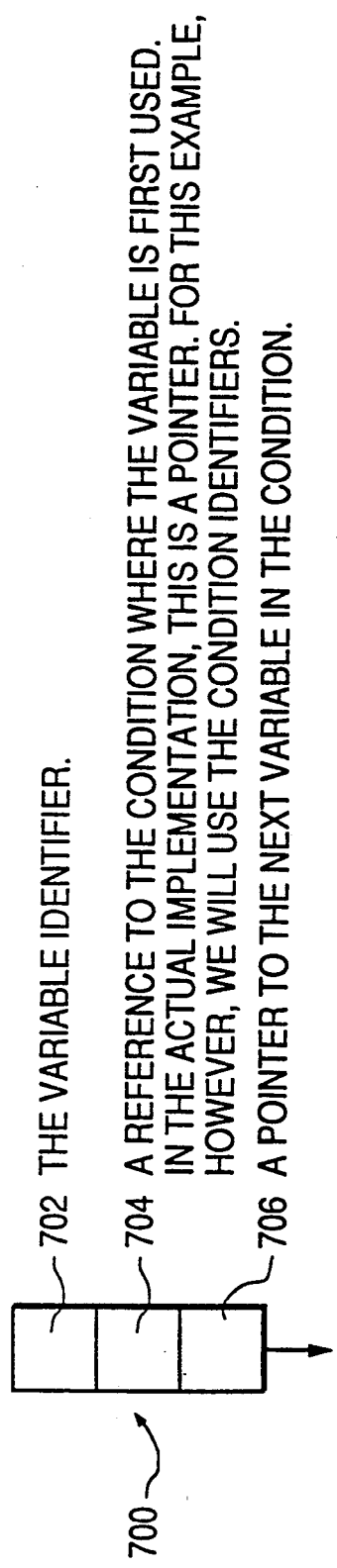

- 702 THE VARIABLE IDENTIFIER.
- 704 A REFERENCE TO THE CONDITION WHERE THE VARIABLE IS FIRST USED. IN THE ACTUAL IMPLEMENTATION, THIS IS A POINTER. FOR THIS EXAMPLE, HOWEVER, WE WILL USE THE CONDITION IDENTIFIERS.
- 706 A POINTER TO THE NEXT VARIABLE IN THE CONDITION.

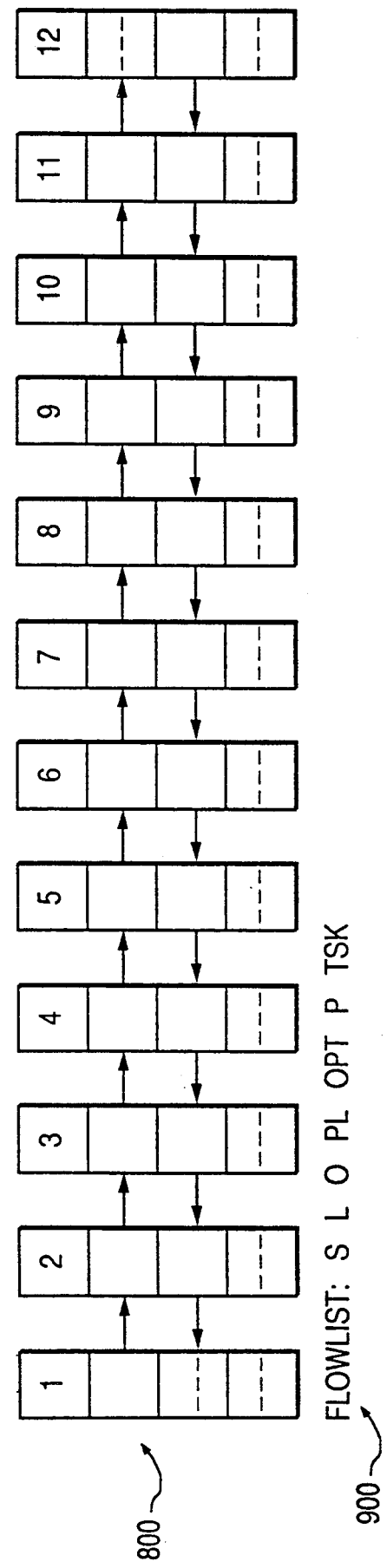

EFFICIENTLY ORGANIZING OBJECTS IN A RETE PATTERN MATCHING NETWORK

BACKGROUND INFORMATION

1. Field of the Invention

The invention broadly relates to an improved expert system method. In particular, an improved method for organizing objects in a RETE pattern matching network is disclosed.

2. Background Art

Many expert system development shells make use of the RETE pattern matching algorithm. The RETE algorithm itself is well know in the artificial intelligence community. Detailed information on the RETE algorithm can be obtained from the following references: A. Gupta and C.L. Forgy, *Measurements On Production Systems*, Technical Report CMU-CS-83-167, Carnegie Mellon University, 1983; C.L. Forgy, *RETE: A Fast Algorithm For The Many Pattern/Many Object Pattern Match Problem*, Artificial Intelligence (1982), pp. 17-37; and M.I. Shore, T.P. Daley, H.S. Lee and B.R. Tibbits, *Advances In RETE Pattern Matching*, Proceedings of AAAI-86, the disclosures of which are hereby incorporated by reference.

In addition, the following patents/patent application also are pertinent to the RETE pattern matching algorithm: Ser. No. 515,843, entitled "A System And Method For Building A Computer-Based RETE Pattern Matching Network," filed on Apr. 27, 1990 by C.R. Grady F.D. Highland C.T. Iwaskiw, and M.S. Pfiefer, U.S. Pat. No. 4,924,408 entitled "Technique For Compilation of Knowledge Bases" by F.D. Highland, and Ser. No. 515,720, entitled "A Method For Integrating Backward And Forward Chaining Reasoning," filed on Apr. 26, 1990 by H. Gallivan, J.D. Tani, C.T. Iwaskiw, and F.D. Highland, all of which are commonly assigned to the assignee of this invention. The disclosures of the patents/patent applications are all incorporated by reference.

The RETE network is nothing more than a filtration process. A rule is broken into discrete sub-expressions and a RETE noted is built for each of those sub-expressions. Each node performs one task on any data coming into it and broadcasts the results of that test on to the rest of the network. The results which fall out of the bottom of the network are the results of the overall rule. Thus, the RETE algorithm is nothing more than a "divide and conquer" strategy Expressions consisting of tests involving one or more variables are represented in a RETE network by either one input nodes (known as Alpha nodes) or two input nodes (known as Beta nodes). Consider the following examples 1. (A:car) IF A.door=4 THEN . . . translation: if there exists an A in the universe of cars such that A has 4 doors, then say "we have a 4 door car." (i.e., rule is true if a 4 door car is found.)
2. (A:car, B:truck) IF A.color=B.color THEN . . . translation: if there exists an A in the universe of cars and there exists a B in the universe of trucks such that A has the same color as B then say "we have a pair of vehicles with the same color." (i.e., rule is true if a car/truck pair has the same color.)

These two rules would appear in the RETE network as shown in FIGS. 1A and 1B, respectively. In both cases, these RETE nodes work as filters. All of the relevant data goes into them, but only that data meeting a certain criterion comes out. In other words, only a subset of A's survive the Alpha node and only a subset of the pairs A-B survive the Beta node.

If more than two variables are required in a test, successive variables are combined in one or more AND nodes. When all of the required data is available at two points in the RETE net, the two points are connected into a Beta node. A test involving A, B and C would appear as shown in FIG. 2. An Alpha node might attached underneath another Alpha node which tests another aspect of the same variable. Anything that survives the second Alpha node will have survived the first Alpha node as well.

Large RETE networks can be constructed from Alpha and Beta nodes, as well known in the art. RETE networks may be used to implement the semantics of positively quantified expressions (e.g., there exists on A), negatively quantified expressions (e.g., it is not the case that there exists on A), and mixed quantified expressions (e.g., there exists on A while there does not exist on B).

While RETE networks work well in performing expert reasoning, they can be somewhat cumbersome to process due to variations in their organizational structure in the network. This variation stems from the arbitrory ordering of conditions in a rule which can directly impact the performance of the resultant RETE network. It is desirable to have a method for organizing objects in a RETE network to further improve the inferencing speeds of an expert system.

OBJECTS OF THE INVENTION

It is an object of this invention to provide a method for reordering the conditions in a rule to improve its performance in a RETE network.

It is another object of this invention to provide an expert system for which rules can be written without regard to RETE network constraints.

It is still another object of this invention to provide a RETE network system in which reordering of rules is performed automatically without user intervention.

SUMMARY OF THE INVENTION

These objects, and other advantages as will become apparent, are achieved by the inventive method in which the reordering of conditions in a rule is performed automatically without the need for user intervention. All the user does is write the rule in any order that makes sense from a readability standpoint.

At the heart of the invention is the concept of a "shuffleboard," a data structure conducive to sorting elements. The shuffleboard is essentially a list of lists. It is comprised of a set of nodes which are linked together in a series of columns. Each column corresponds to a test condition within a rule, and each node within a column corresponds to a variable referenced by the test condition The shuffleboard approach provides a means of finding all tests using a given variable and associating those tests. The shuffleboard provides a frame of reference for constructing a new ordering of tests from which the RETE network can be constructed.

BRIEF DESCRIPTION OF THE DRAWINGS

FIGS. 1A & 1B are diagrams which show the RETE networks for 1-input Alpha nodes and 2-input Beta nodes, respectively.

FIG. 2 is a diagram which shows the RETE network for a 3 variable rule including an AND node and a Beta node.

FIG. 3 is a diagram which shows an example rule in a knowledge representation language.

FIG. 6 is a diagram which shows the data structure for each condition in a rule.

FIG. 7 is a diagram which shows the data structure for each variable in a condition.

FIG. 13 is a diagram which shows the shuffleboard with optimized flowlist following completion of the shuffling.

DESCRIPTION OF THE PREFERRED EMBODIMENT

Figure 4:
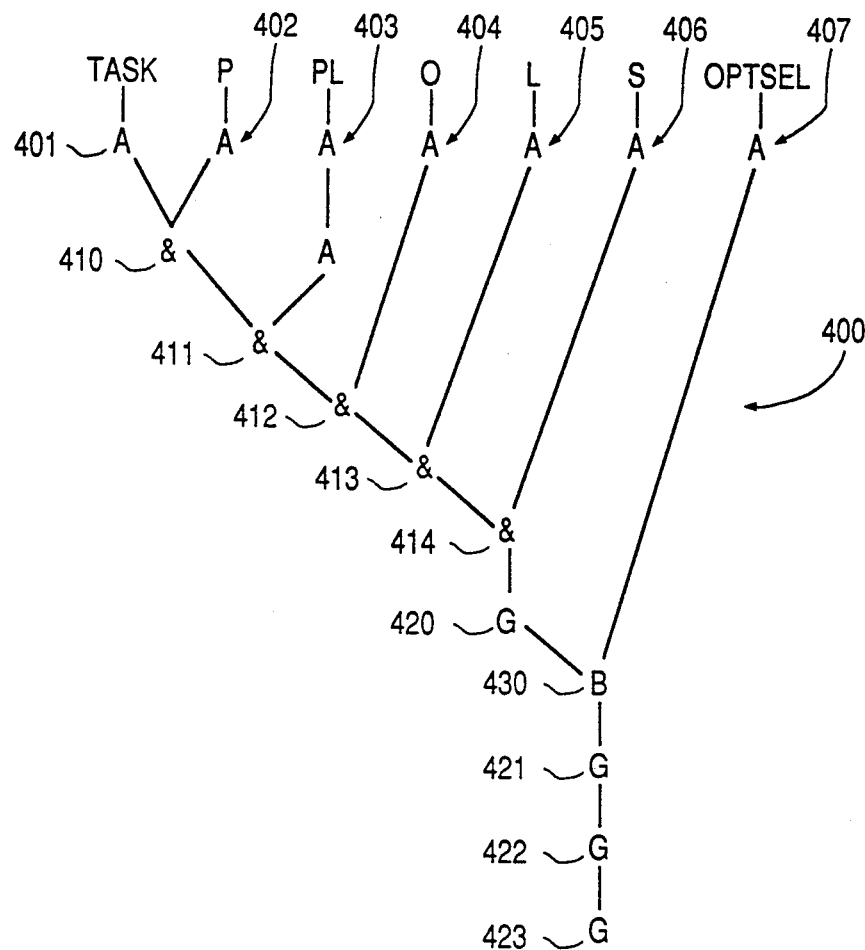
FIG. 4 is a diagram which shows the RETE network for the example rule of FIG. 3.

The '408 patent and the copending patent applications describe the preferred computer hardware and software environment for the IBM product "The Integrated Reasoning Shell" (IBM and The Integrated Reasoning Shell are registered trademarks of IBM Corp.). The Integrated Reasoning Shell performs expert inferencing using the RETE algorithm. This invention has been implemented as an enhancement to the processing of the RETE algorithm included in that product. Since the operation of the RETE algorithm is well understood by those skilled in the art and beyond the scope of this invention, additional details of the algorithm are not provided herein.

In general, the reordering process for the RETE network is as follows:

1. Build a list of all positively quantified multi-input tests.
2. Build a list of all negatively quantified multi-input tests.
3. Record any mixed quantifed multi-input tests on both lists.
4. For each list:
   a) build the shuffleboard based on contents of list;
   b) erase list;
   c) rearrange shuffleboard;
   d) rebuild list based on content of shuffleboard;
   e) erase shuffleboard.
5. Resume normal processing.

At the heart of the design is the concept of a "shuffleboard," a data structure conducive to sorting elements. The shuffleboard approach provides a means of finding all tests using a given variable and associating those tests. The shuffleboard provides a frame of reference for constructing a new ordering of tests from which the RETE network can be constructed.

The shuffleboard is essentially a list of lists. It is comprised of a set of nodes which are linked together in a series of columns. Each column corresponds to a test condition within a rule. Each node within a column corresponds to a variable reference by the test condition.

Since the shuffleboard contains all of the variables used within a rule, it serves as a vehicle for finding multiple occurrences of the same variable. Once duplicate variables are found, they are removed from the shuffleboard. Pointers are then adjusted to reference the earliest instance of each variable in the rule. In this way, test conditions using a common variable are made into neighbors on the shuffleboard. Once test conditions have been shuffled (hence, the name shuffleboard), it is a trivial matter to construct a new list of tests which reflects an ordering based on commonality of variables used.

The information stored in each shuffleboard node is as follows:

status—Describes status of node within the shuffleboard.
name—Name of variable from test condition
next13 element—Next element in column
next—Next column
previous—Previous column The shuffleboard construction and the "shuffling" process can be described by way of the following example.

Consider a rule which performs twelve tests, taken from an airplane maintenance planning knowledge base. The objective statement of the rule is:

Due to the changes in schedules, a plane on its current route is going to miss its next "A" maintenance requirement. There exists another plane on another route which can be swapped with the problem plane so that the problem plane is able to make its maintenance check requirement. This rule finds those two planes and swaps their route assignments.

This rule appears in a pseudo-English rule design as follows:

| IF | | |
|---|---|---|
| | The current task is "option selected" | AND |
| | The problem determination search is not complete | AND |
| | The plan is assigned to a route | AND |
| | The current option being considered is to place another plane on the same route | AND |
| | This is the last leg of the route | AND |
| | The next maintenance requirement for this plan is an "A" check | AND |
| | The station being considered provides "A" checks | AND |
| | There is a problem with the plane's current route | AND |
| | More desirable options have already been considered and found not to be acceptable | AND |
| | The date of this leg of the route is the same day that the "A" check maintenance is required on the plane | AND |
| | The plane currently assigned to this leg is the alternate plane being considered | AND |
| | The leg is terminating at the maintenance station | |
| THEN | | |
| | ... | |
| END | | |

The actual rule in a knowledge representation language syntax would appear as shown in FIG. 3. The following list corresponds to the order in which the test appear in the rule. Each item on the list contains the pattern-matching variables used in the corresponding tests.

1. TASK
2. P
3. PL
4. O
5. L
6. PL

7. S
8. PL,P
9. O,OPTSEL
10. L,PL
11. L,O
12. S,L

Note that the bottom five items denote Beta tests which involve two variables.

If the rule in FIG. 3 is rendered into a RETE network, the resultant structure is rather cumbersome as shown in FIG. 4. The resultant RETE network 400 contains seven Alpha nodes 401–407, five AND nodes 410–414, four Gamma nodes 420–423, and one Beta node 430.

Note the excessive number of AND nodes 410–414 appearing in the network 400. They are present merely to merge the unrelated Alpha tests. The merge is necessary in order to have all of the required variables available for the Beta test 430. The merging of variables must occur from left to right and may not skip over intervening variables which may not be germaine. This requirement is necessary to eliminate a phenomenon known as "crossed links."

Also, note the number of Gamma nodes. The use of Gamma nodes instead of Beta nodes reflects the fact that all variables already available in that node need to be merged via the right input. While this combination of AND nodes and Gamma nodes is functional, excessive number of nodes reflects redundancy. Beta nodes can accomplish the same functions as the Gamma nodes while at the same time performing the merge functions of the AND nodes. By simply rearranging the rules and conditions, the rule can be automatically rephrased in such a way that the resultant RETE network is very streamlined. The network would look vastly different if the same rule tests were written in the following order:

1. S
2. L
3. L
4. PL
5. PL
6. P
7. S,L
8. L,O
9. L,P,L
10. O,OPTSEL
11. PL,P
12. TASK

Figure 5:
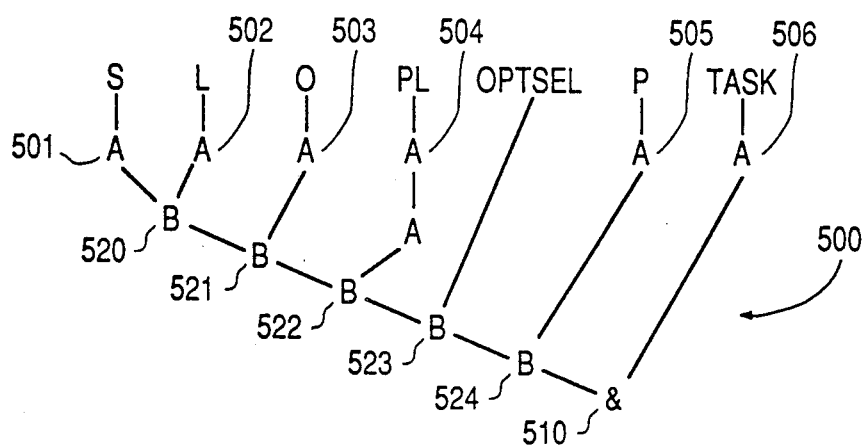
FIG. 5 is a diagram which shows the optimized RETE network for the example rule in FIG. 3.

If this rule is rendered into a new RETE network, the resultant would be much more compact than the network 400 in FIG. 4. This new network 500 is shown in FIG. 5. The resultant RETE network 500 contains seven Alpha nodes 501–506, one AND node 510, zero Gamma nodes, and five Beta nodes 520–524. Clearly, the ordering of tests within a rule has a great bearing on the overall structure on the size of the corresponding RETE network. This in turn affects memory utilization.

As stated above the shuffleboard is essentially a list of lists. It is comprised of a set of shuffleboard nodes which are linked together in a series of columns. Each column corresponds to a test condition within a rule. Each node within a column corresponds to a variable reference by the test condition. Thus, the shuffleboard is largely a representation of all variables used within a rule.

Since the shuffleboard contains all of the variables used in a rule, it serves as a convenient vehicle for finding multiple occurrences of the same variable. Once duplicate variables are found, they are removed from the shuffleboard. Pointers are then adjusted to reference the earliest instance of each variable in the rule. In this way, test conditions using a common variable are made neighbors on the shuffleboard. Once test conditions have been shuffled, a new list of tests which reflects an ordering based on commonality of variables used can be constructed.

The data structure 600 associated with each condition in a rule is shown in FIG. 6. Box 602 would contain the identifier for the the condition, which in this example would be a number. Box 604 contains a pointer to the next condition for the rule. Block 606 contains a pointer to the previous condition for the rule, and Box 608 contains a pointer to the first variable in the condition.

The data structure 700 associated with each variable in a condition is shown in FIG. 7. Box 702 contains an identifier for the variable. Box 704 contains a reference to the condition where the variable is first used. In actual implementation, this is a pointer, but for this example, it is the condition identifier for simplicity. Box 706 contains a pointer to the next variable in the condition. The symbol "--" is used to denote a pointer that is not currently pointing to anything.

Figure 8:
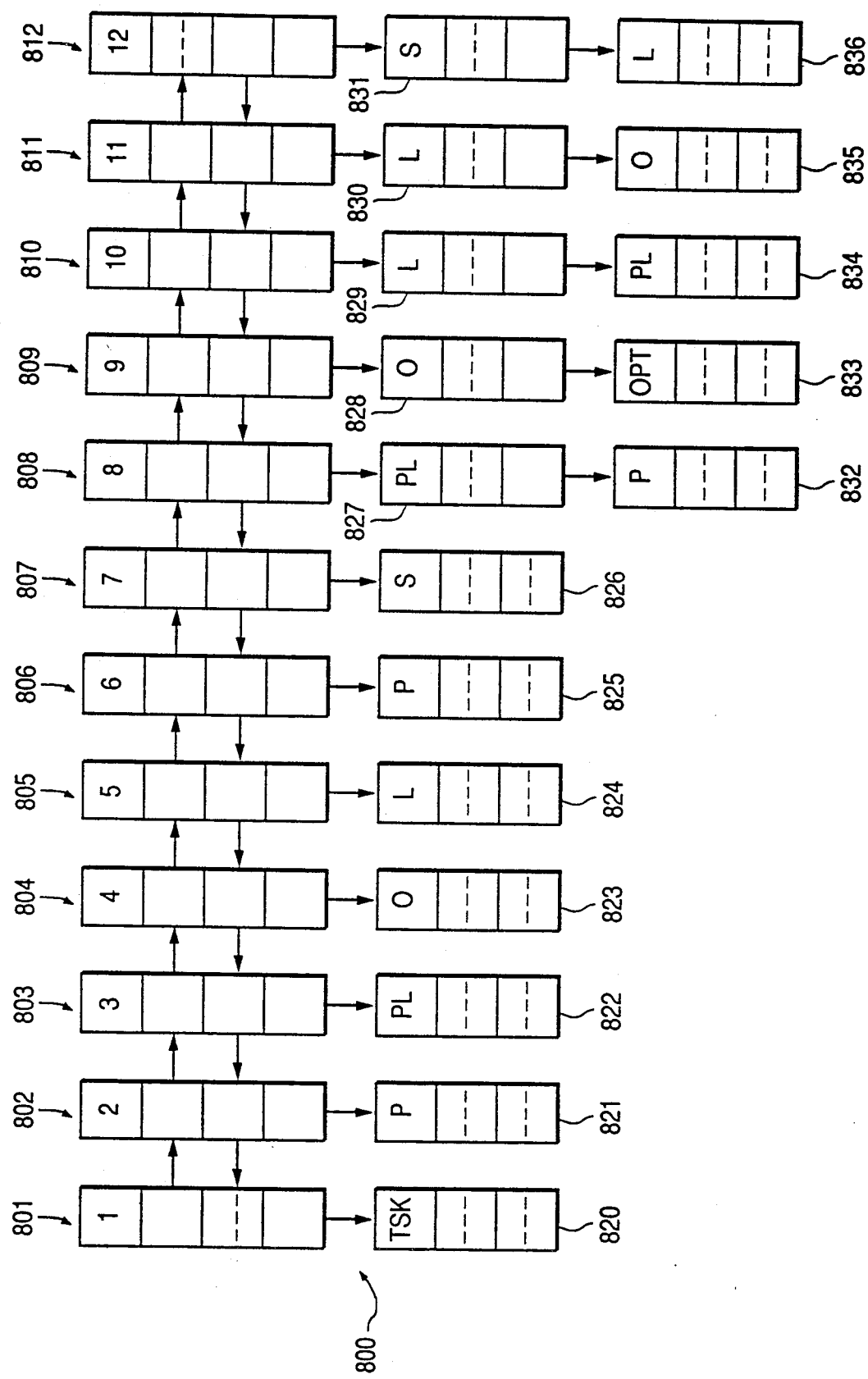
FIG. 8 is a diagram which shows the shuffleboard for the rule of FIG. 3 prior to optimization.

Diagram 800 in FIG. 8 shows the initial state of the shuffleboard for the rules shown in FIG. 3 and its accompanying RETE network 400 shown in FIG. 4. There are twelve conditions 1-12 shown in columns 801-812, respectively. Each of the variables that are associated with each condition are contained in nodes 820-836. The first seven conditions represented by columns 801-807 reference one variable and the remaining five conditions represented by columns 808-812 reference two variables. A number of variables are referenced multiple times in separate conditions in this rule.

Figure 9:
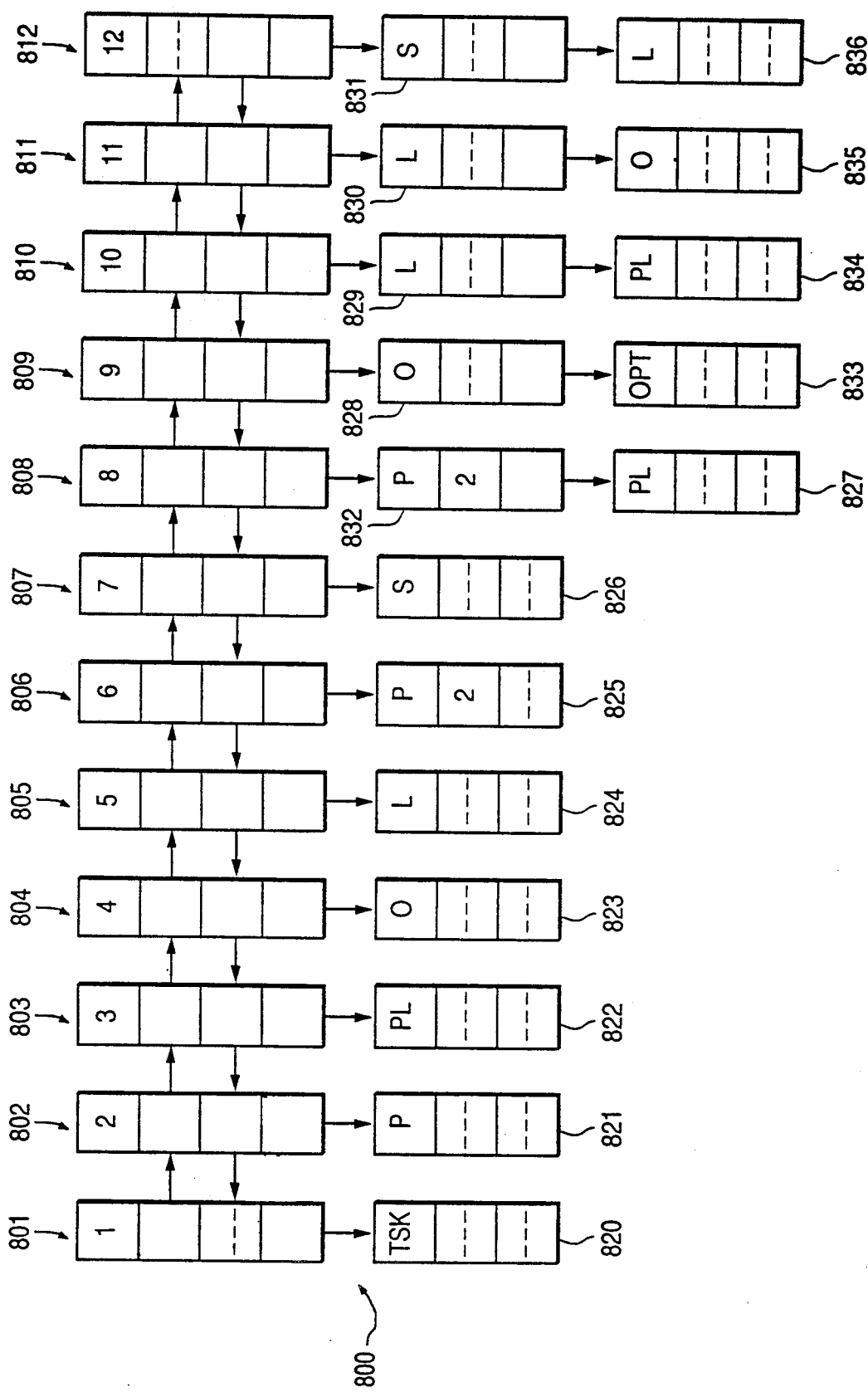
FIGS. 9-12 are diagrams which show the shuffleboard at different stages during the shuffling process.

The first step in the processing is to identify the duplicate use of variables and to indicate the first condition in which the variable is used in each variable's data structure. This is accomplished by working from left to right, matching each variable one at time to all of the variables in the rest of the conditions. If there is a duplication, the first condition number is stored with the duplicate variable (Block 704 in FIG. 7). In this example, TASK (abbreviated as TSK) (node 820) is not used in any other conditions. P, however, which is contained in node 821 under condition 2 (802) is duplicated in nodes 825 and 832, under conditions 6 (806) and 8 (808), respectively. Therefore, a numeral 2 is placed in nodes 825 and 832. Also, when more than one variable is included in the condition, the variable having the highest number rises to the uppermost position closest to the condition itself. Therefore, node 832 would change places with node 827. The shuffleboard 800 in FIG. 9 shows the shuffleboard after this processing step, for the variable P of Block 821.

Figure 10:
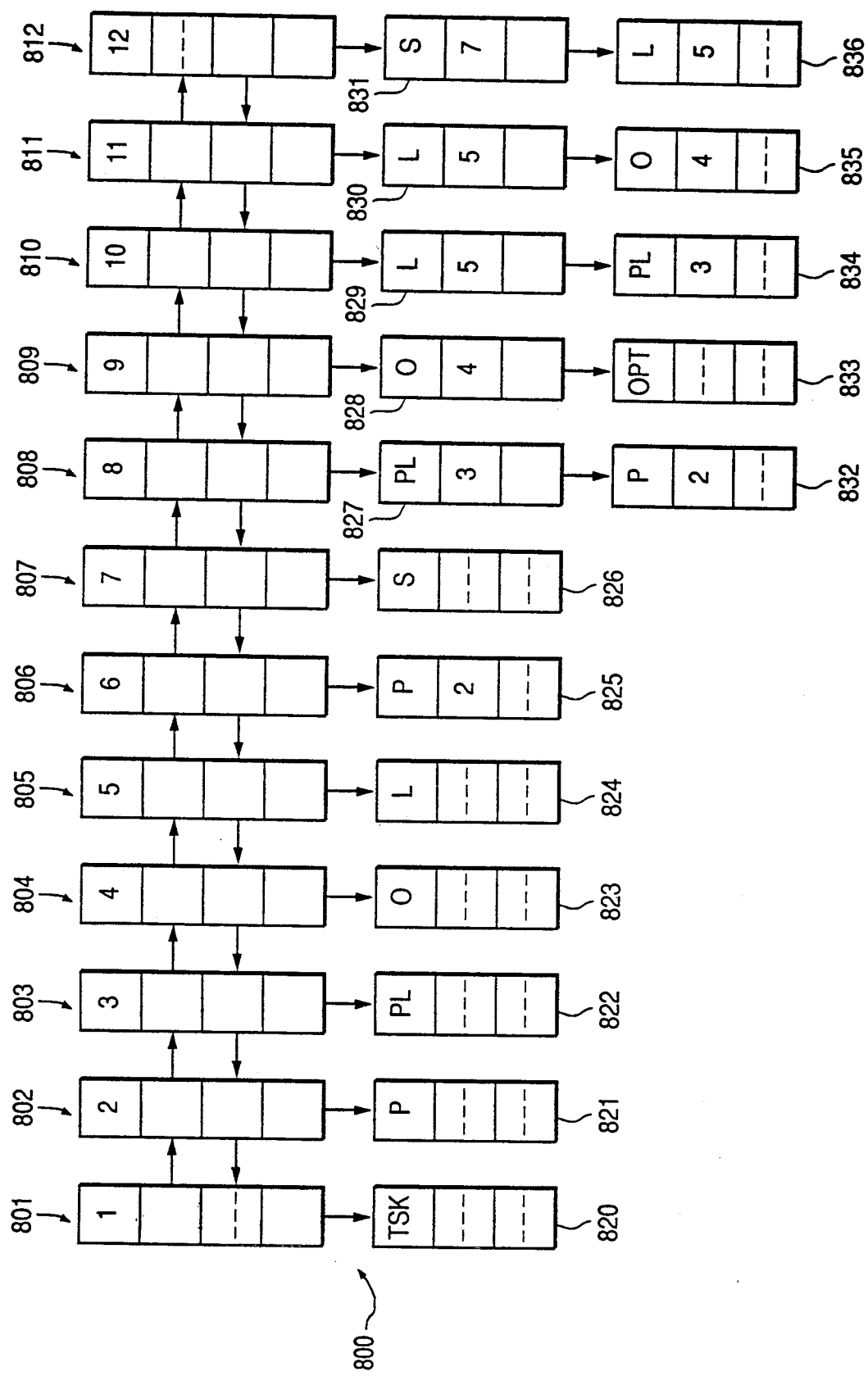

At the conclusion of this processing for all variables, the shuffleboard would appear as shown in FIG. 10.

After all of the duplicate variables have been identified, the next step is to begin building an optimized flow list. To build the flow list, start from the last condition 812 and work from right to left. If a variable is a duplicate, then jump to the referenced condition and process the variables in that condition first. Once a variable has been processed, it is removed so it is not processed twice.

The first variable in the last condition 12 (812) is "S" (831). Since it is a duplicate of the variable in condition 7 (807) all of the variables in condition 7 are processed.

Figure 11:
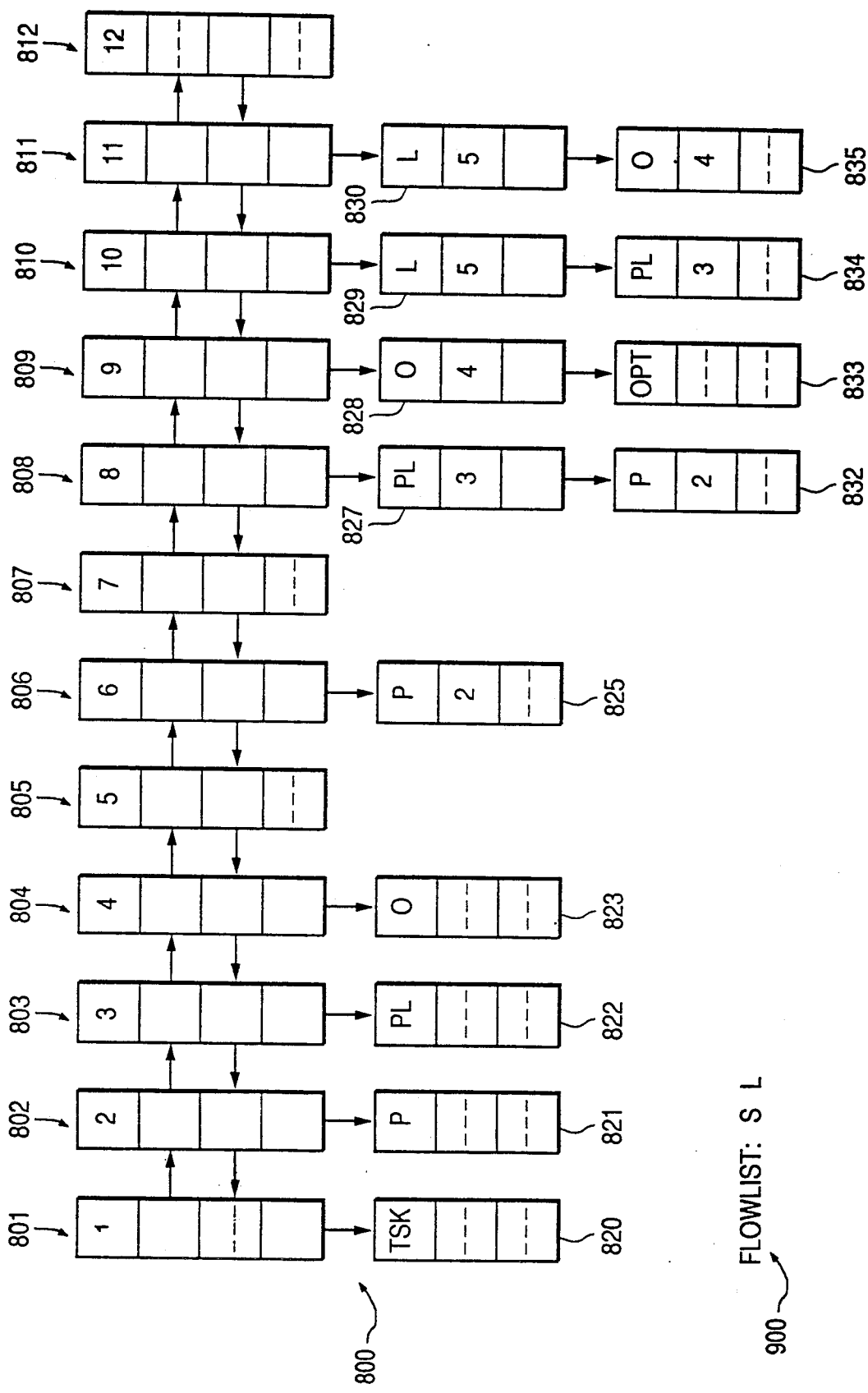

During the processing, the variable "S" is put in the flow list, and then those Blocks 826 and 831 that contain the variable "S" are deleted. Then, processing returns to condition 12 (812) to continue processing its variable "L" in Block 836. This contains a pointer to condition 5 (805). Then, the variable "L" gets put in the flow list and the structures 824 and 836 gets deleted. FIG. 11 shows the shuffleboard 800 after processing the variables "S" and "L" and illustrates the presence of those variables in the flow list 900.

Figure 12:
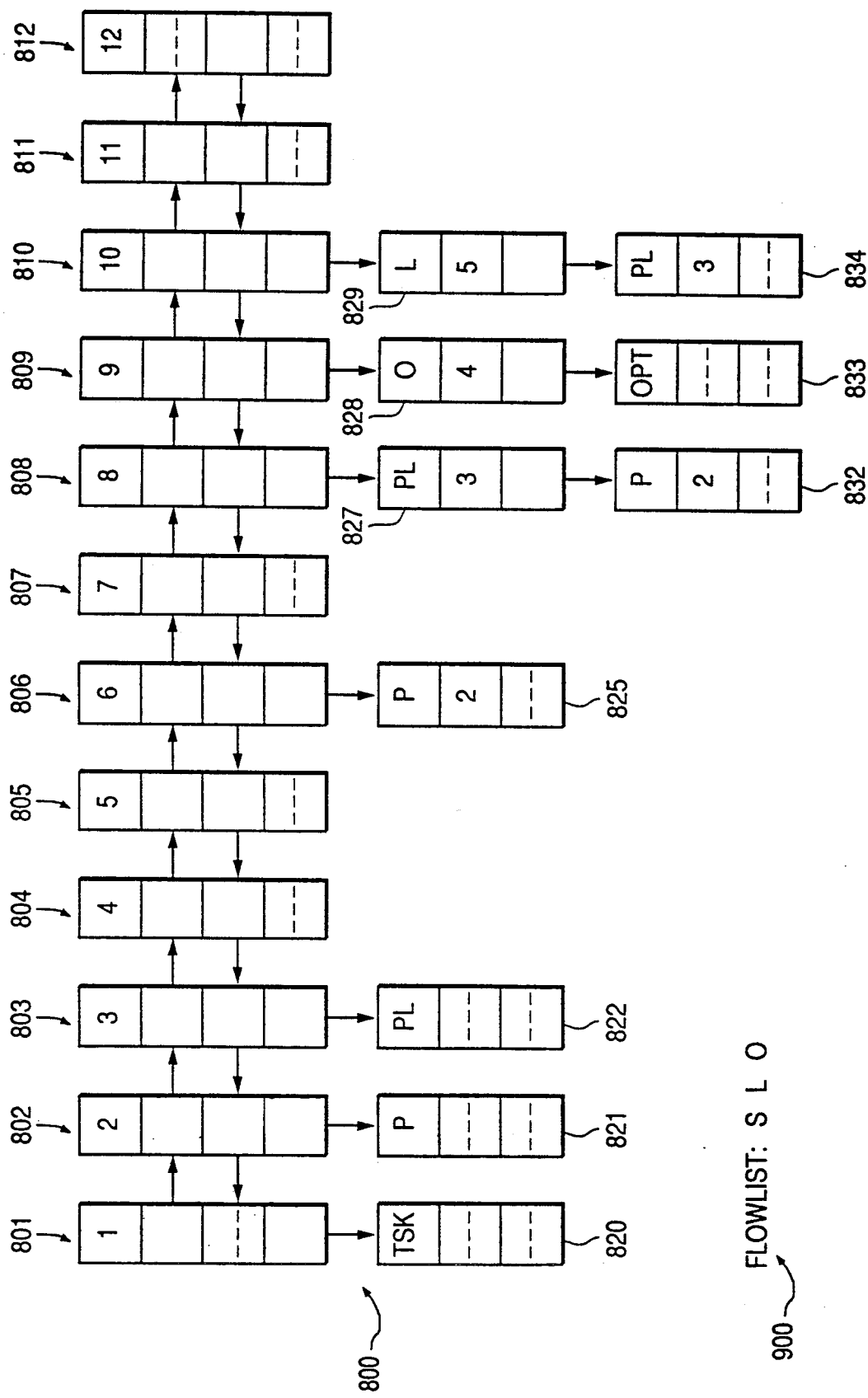

The process then moves on to condition 11 (811), and begins processing its variables "L" and "O" in nodes 830 and 835 respectively. The first variable "L" (node 830) is a duplicate of a variable in condition 5 (805). Looking at condition 5 (805), it is seen that there are no variables in that condition's list because they already have been processed. Therefore, that node 830 is deleted and processing continues to the second variable "O" in node 835 under condition 11 (811). Node 835 contains a pointer to condition 4 (804) and its variable "O." Therefore, "O" gets added to the flow list 900 shown in FIG. 12 and nodes 823 and 835 are deleted. The resulting shuffleboard after this step is shown in FIG. 12.

Processing continues for conditions 10-1 (columns 810-801) until all conditions have been processed. The resulting shuffleboard 800 and flow list 900 are shown in FIG. 13. This process insures that each variable will be placed in the flow list 900 only once, and in an order that guarantees that the smallest RETE network can be built to represent these rule conditions. In this case, notice that the resulting flow list matches the desired optimal order shown above.

While the invention has been described with reference to a preferred embodiment, it will be understood by those skilled in the art that various changes can be made to the architecture without departing from the spirit and scope of the invention. Accordingly, the invention shall be limited only as specified in the following claims.

We claim:

1. An improved computer method for optimizing the ordering of tests in an expert system rule from which a RETE network is to be derived comprising the following steps:

building separate lists of positively quantified tests, negatively quantified tests and mixed quantified tests in a computer memory;

for each of the lists, constructing in memory a shuffleboard data structure containing a set of nodes linked together, said nodes corresponding to variables referenced by the tests;

identifying all tests containing the same variable and including a pointer to the first test referencing that variable within each of the nodes containing the duplicate variables;

working from the last condition to the first condition, construct a flow list of variables by first adding each variable encountered in the shuffleboard to the flow list, removing that node from the shuffleboard, and if the node contains a pointer to other occurences of that same variable, removing those nodes from the shuffleboard and processing all the variables associated with those tests;

repeating the prior step for each variable encountered while working from the last condition to the first condition until all nodes are removed; and constructing an optimized RETE network using the resultant flow list of variables.

* * * * *